United States Patent [19]

Papciak et al.

[11] Patent Number: 4,620,247

[45] Date of Patent: Oct. 28, 1986

[54] DISKETTE SPRING AND DISKETTE

[75] Inventors: Walter A. Papciak, Elmwood Park; Karl K. Hoffman, Arlington Heights; Roger Engel, Schaumburg; Adam Wieczorek, Chicago, all of Ill.

[73] Assignee: Plicon Corporation, Elk Grove Village, Ill.

[21] Appl. No.: 741,171

[22] Filed: Jun. 4, 1985

[51] Int. Cl.[4] .................... G11B 5/012; F16F 1/18
[52] U.S. Cl. ...................... 360/97; 360/99; 360/133; 267/158
[58] Field of Search .............. 360/97, 98, 99, 133, 360/137; 267/158

[56] References Cited

U.S. PATENT DOCUMENTS 3,254,884  6/1966  Long et al. .................. 267/158
4,214,292  7/1980  Johnson ..................... 267/158 X
4,272,793  6/1981  Van Landingham .......... 360/133 X

FOREIGN PATENT DOCUMENTS 2067000  7/1981  United Kingdom .................. 360/99

Primary Examiner—A. Michael Chambers
Assistant Examiner—John C. Fox
Attorney, Agent, or Firm—Hill, Van Santen, Steadman & Simpson

[57] ABSTRACT

An improved spring structure for a micro floppy diskette is provided which utilizes a formed strip of relatively rigid plastic sheeting (preferably polyester) having at least two generally uniform wave crest regions with a trough therebetween which extend transversely across such strip. Micro floppy diskettes incorporating such spring structure display improved capacity to wipe surface portions of the flexible disk and have extended service lives.

22 Claims, 8 Drawing Figures

U.S. Patent  Oct. 28, 1986  4,620,247
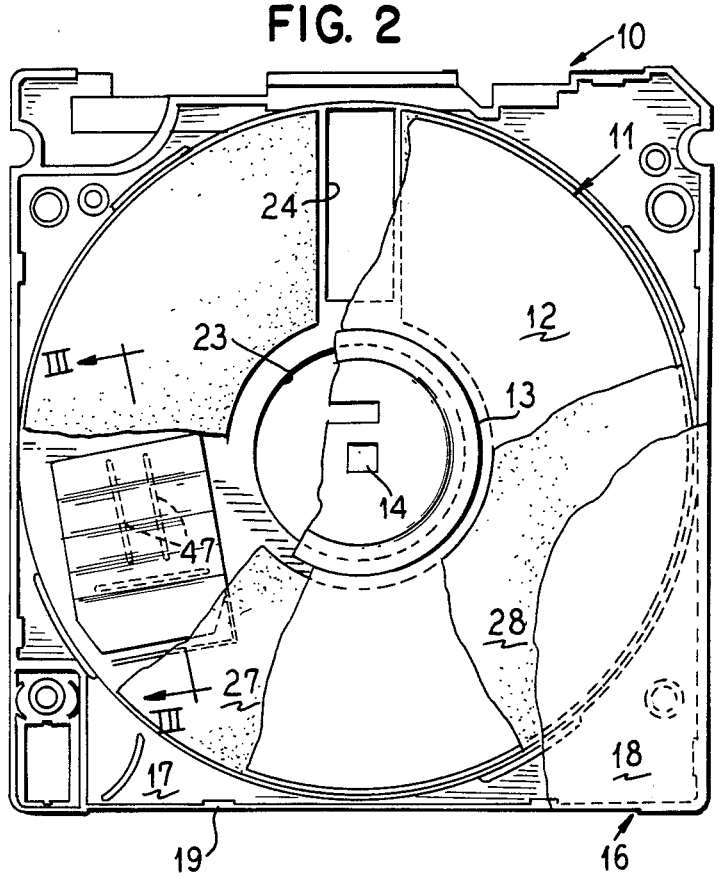
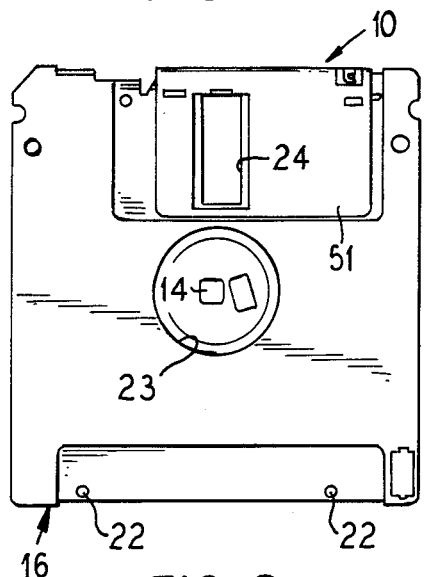
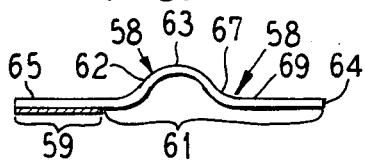
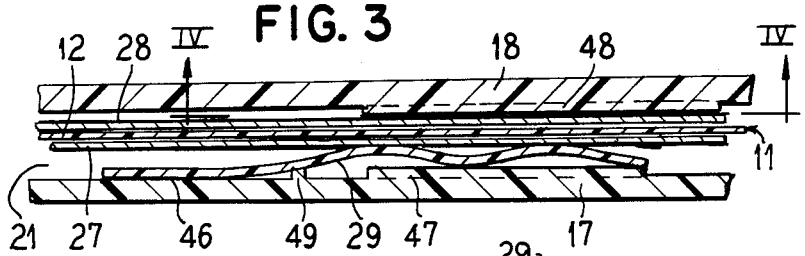
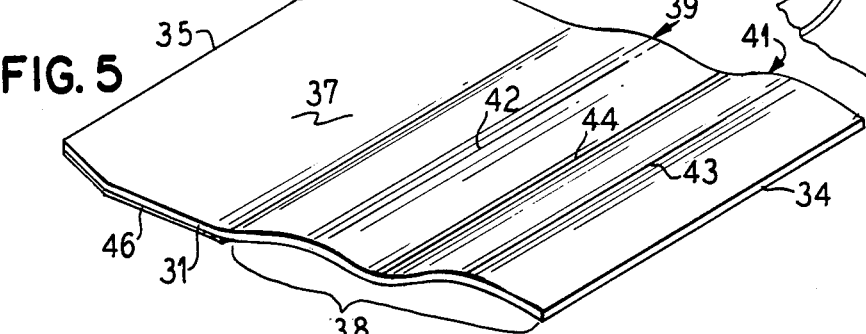
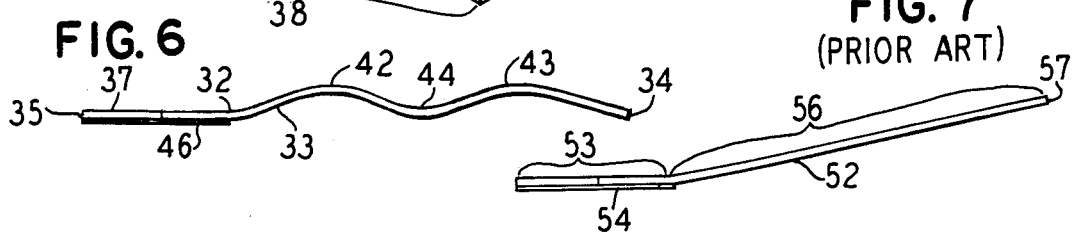
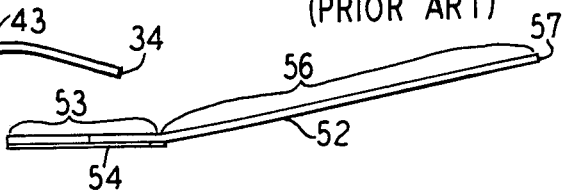

DISKETTE SPRING AND DISKETTE

BACKGROUND OF THE INVENTION

1. Field of the Invention

This invention lies in the field of micro floppy diskettes, and more particularly pertains to spring structures for use in such diskettes.

2. Prior Art

A micro floppy diskette conventionally incorporates a spring means which is adapted to provide a localized yielding bias between working surface portions of the disk and adjacent portions of a pad member associated with the diskette jacket assembly.

Micro floppy diskettes are coming into wide spread usage in computers, especially in so-called personal computers, as the memory, or information storage means. Briefly, each such diskette comprises a revolvable 3.5 inch flexible disk of magnetizable composition which is housed in a jacket assembly. In use after positioning in a computer, the jacket assembly remains stationary while the disk is revolvably driven by a shaft functionally axially engaged with the disk at its hub. Computer record and read out heads are functionally associated with the disk through slotted aperture means provided in the jacket assembly. The structure and operation of the computer-associated mechanisms employed in micro floppy diskette utilization are well known to those skilled in the art and do not as such comprise any part of the present invention.

The spring means heretofore used in micro floppy diskettes suffer from various problems. For one thing, such prior art springs can tend to fail at their characteristic bend, resulting in a failure of the desired localized wiping action between disk working surface portions and pad member. Debris and dust then accumulates on such disk portions tending to result in such serious interference with normal record and read out functions. The failure evidently occurs because a heat build up tends to occur in the region of this bend which causes the material of which the spring is constructed to relax and lose tension at the bend site.

For another thing, such prior art springs have a terminus or end which is permitted to loosely rest against a portion of a pad member in the jacket assembly. Flexing forces exerted against the bend of such a prior art spring cause sliding action to occur between the spring end and the housing side wall portions. The result is that spring biasing capability is unstable and uncertain, making the achievement of uniform, constant biasing action difficult if not impossible to achieve and maintain.

Improvements in such springs and in micro floppy diskettes outfitted therewith are desirable and even necessary in order to obtain the diskette reliability needed for continued growth in micro floppy diskette usage.

BRIEF SUMMARY OF THE INVENTION

More particularly, this invention is directed to a new and very useful spring structure for a micro floppy diskette, and to the micro floppy diskettes which incorporate such spring structure.

A principal object of the present invention is to overcome the disadvantages above indicated which are associated with the known prior art spring structures for micro floppy diskettes.

Another principal object is to provide a new and substantially improved spring structure which is highly useful and effective in micro floppy diskettes for achieving stable, reliable localized biasing between disk and pad means thereof.

Another object is to provide such an improved spring structure which is simple and inexpensive.

Another object is to provide such an improved spring structure which can be utilized in combination with other known, and previously developed, manufactured, and used components of micro floppy diskettes, thereby avoiding what would otherwise be the necessity for redesign and retooling of equipment used to make components for micro floppy diskettes.

Another object is to provide an improved micro floppy diskette which incorporates such an improved spring structure and which displays improved flexible disk wiping characteristics and which have extended service lives.

Other and further aims, objects, features, purposes, advantages, uses, and the like for the present invention will be apparent to those skilled in the art from the present specification taken together with the drawings.

BRIEF DESCRIPTION OF THE DRAWINGS

In the drawings:

FIG. 1 is a top plan view of one embodiment of a micro floppy diskette of the present invention;

FIG. 2 is an enlarged view similar to FIG. 1, but with some parts theeof broken away;

FIG. 3 is a vertical sectional view taken along the line III—III of FIG. 2;

FIG. 4 is a tranverse sectional view taken along the line IV—IV of FIG. 3;

FIG. 5 is a perspective view of one embodiment of a spring structure of the present invention which is utilized in the micro floppy diskette shown in FIGS. 1-4;

FIG. 6 is a side elevational view of the spring structure of FIG. 5;

FIG. 7 is a side elevational view similar to that of FIG. 6, but of a spring structure of the prior art; and FIG. 8 is a side elevational view similar to that of FIG. 6, but showing a further embodiment of a spring structure of this invention.

DETAILED DESCRIPTION OF THE INVENTION

Referring to FIGS. 1-4 there is seen one embodiment of a micro floppy diskette of the present invention which is herein designated in its entirety by the numeral 10. The diskette 10 incorporates a generally flexible disk member 11 which has a peripheral flexible circular flattened plate-like portion 12 which is comprised of a magentizable composition and an associated hub portion 13 having an axial aperture 14 defined therein, such hub portion 13 being conveniently comprised of formed sheet metal or the like.

A jacket assembly which is herein designated in its entirety by the numeral 16 is positioned generally about the flexible disk member 11. The jacket assembly 16 includes a peripherally abutting pair of housing halves 17 and 18, respectively, which have a generally square perimeter configuration and which are each comprised of a preformed rigid plastic material, such as, for example, injected molded ABS resin or the like. An in-turned shoulder 19 is generally provided peripherally about each housing half 17 and 18, and, when the housing halves 17 and 18 are brought together with the respective shoulder 19 of each half abuttingly engaging the other thereof, a pocket space 21 is defined between the assembled halves 17 and 18.

To secure the housing halves 17 and 18 together in an assembled diskette 10, some fastening means is provided. In diskette 10, the fastening means is conveniently provided by a plurality of sonic weldments 22.

The disk member 11 is centrally received within the pocket space 21. Each of the housing halves 17 and 18 has formed therein a central aperture 23 for computer shaft insertion into the hub portion 13. Also, a generally radially extending slotted aperture 24 is defined in each of the housing halves, here illustratively shown in housing half 18, the apertures 24 being coincidally positioned to overlie portions of the disk member 13 for access thereto by a computer magnetic head members.

Within space 21 a pair of pad members 27 and 28 are provided. Preferably, portions of the face of each pad member 27 and 28 are associated with adjacent portions of respective housing halves 17 and 18, respectively. Such association can be achieved by means of an adhesive or by means of heat sealing or the like. In diskette 10, heat sealing is employed. Each of the pad members 27 and 28 is positioned preferably in a central flexible disk 11 receiving aperture formed into each of the housing halves 17 and 18. Thus, the pad members 27 and 28 each have a circular configuration around their respective perimeters and also are each provided with a central aperture formed therein. Each pad member 27 and 28 is comprised of a thin, soft, flattened, resilient, flexible, uniform, porous organic polymeric material, such as, for example, a non-woven fabric comprised of polyester, or the like. As illustrated, for example, in FIG. 3, in the assembled diskette 10, each one of the pad members 27 and 28 is disposed on a different peripheral side of the flexible disk member 11. These pads 27 and 28 remain stationary with the housing halves 17 and 18 when the flexible disk member 11 is revolved when the diskette 10 is positioned in a computer and utilized for information storage and retrieval. These pads 27 and 28 serve as bearing means which permit disk member 11 to revolve without interference from adjacent side walls portions of the housing halves 17 and 18.

The jacket assembly 16 further incorporates a spring means positioned between at least one of the housing halves, here housing half 17, and the associated pad member, here pad member 27, thereby to provide a localized yielding axially exerted bias continuously against such pad member. In the embodiment shown, the spring means is provided by a spring structure 29. The effect of such bias is to produce a localized wiping action by the pad member 27 upon adjacent surface portions of the disk member 11 as the disk member 11 rotates. The function of this wiping action is to remove any dust or other contaminating particulate matter from surfaces of the plate-like portion 12 which particular matter might otherwise interfere with the record and read out of information from plate-like portion 12 during use of a diskette 10 in a computer. The wiping action can also spacially stabilize the plate like portion "12".

The spring structure 29 (referring, for example, to FIGS. 5 and 6) is seen to include an elongated piece 31 of plastic sheeting having opposed parallel faces 32 and 33, and a front end 34 and an opposite back end 35. The plastic sheeting is comprised of a resilient, flexible, relatively rigid, preformed, temperature stable over the range from about 40° through 140° F., uniform organic polymeric material. A present preference is to employ a polyester (particularly polyethylene terephthalate) sheeting having a thickness in the range from about 2 to 5, mils, although, as those skilled in the art will appreciate, other polymeric materials can be employed, if desired, as can other thicknesses. Thermoset polyesters are desirable because of their spring retention and memory characteristics.

Such piece 31 includes two regions. One such region 37 is generally flat and is located adjacent the back end 35.

The other region 38 which is longitudinally adjacent the one region 37 has two waves 39 and 41 formed therein. These waves are generally transversly extending, and are longitudinally spaced, and generally parallel relative to one another. The waves 39 and 41 upstand relative to the one region 37, and the waves 39 and 41 have generally uniform crest regions 42 and 43, respectively, which are of generally equal height in relation to one another. A trough region 44 is defined between each adjacent pair of waves, here, waves 39 and 41. The trough region 44 is generally coplanar with the one region 37 and the front end 34 defines the terminus of the last wave, here the wave 41, and the front end 34 is generally coplanar with such one region 37. The front end 34 is considered to comprise a trough.

Thus, each wave in a spring structure of the present invention includes one crest region and each wave extends from a trough to a second trough which is longitudinally spaced from the first trough.

At least a portion of one face, here face 33, in the one region 37 bears a layer 46 of an adhesive. The face 33 is thus opposed to the other face 32 wherein the outer surface of each of the crest regions 42 and 43, respectively, is defined.

The spring structure 29 is positioned and mounted by means of the adhesive layer 46 against a predetermined area of an inside face of housing half 17. For alignment reasons, a slight recess can be, if desired, molded into a predetermined location of the housing half 17. Also, for alignment reasons, the opposite corners of the one region 37 can be excised, as shown, for example, in FIG. 5, if desired.

As the spring structure 29 is associated with the housing half 17, the region 38 is oriented to bring the crest regions 42 and 43 against predetermined portions of the adjacent pad member, here pad member 27, whereby the desired yielding bias can be exerted thereagainst by the spring structure 29. Thus a predetermined portion of the pad member 27 brushes selected mid-areas of the plate-like portion 12 of the flexible disk member 11 during rotation of the flexible disk member 11 in use of the diskette as desired. The spring action thus provides a desired disk drag and a desired disk surface wiping action.

In the spring structure 29, preferably, and as shown, the upper surface of each of the crest regions 42 and 43 is rounded. Thus, the outer surface of each of such crest region 42 and 43 can have a radius of curvature ranging from about 3/64 to 7/64 inches. A present particular preference is to employ a radius of curvature which is about 3/32 inch.

Similarly, and preferably, and as shown in FIG. 5, the trough regions, here trough 44, is rounded. The outer surface of the trough region 44 can conveniently have a radius of curvature in the range from about 3/64 to 7/64 inches, and a present particular preference is to employ a trough region radius of curvature of about 3/32 inch.

While it is presently preferred (and is illustrated herein), to employ a spring structure 29 which has defined therein two waves 39 and 41, with a trough region 44 therebetween, those skilled in the art will appreciate that a plurality (that is, more than two) of waves with corresponding troughs following each wave can be employed in a spring structure of the present invention. When such a plurality of waves are employed, it is presently preferred to employ from about three through eight waves defined in a region 38 of a spring structure with, correspondingly, the number of trough regions ranging from about three through eight, respectively.

Preferably, the adhesive comprising a layer 46 is pressure sensitive and is initially tacky. Such adhesives are well-known to those skilled in the art and are available commercially.

The spring structure 29 is positioned preferably and as shown within about 120° of the slotted aperture 24 relative to the anticipated direction of rotation of the flexible disk member 11.

In the diskette 10, the trough region 44 in the front end 34 rests upon a plurality of upstanding first ribs 47 defined in adjacent portions of the housing half 17. The first ribs 47 preferably extend generally transversely relative to the trough region 44.

The spring structure shown in FIG. 7 and herein identified in its entirety by the numeral 52 is known to the prior art and is believed to have been exclusively used as a biasing means for achieving wiping action between a pad member and a plate-like portion of a flexible disk member in previously known micro floppy diskette structures. The first region 53 is evidently comparable to the one region 37 of spring structure 29 (including the provision of a layer 54 of adhesive on the lower face thereof). However, the second region 56 of spring structure 52 is in effect a singly angularly inclined leaf whose front end 57 exerts a biasing force upon an adjacent pad member. Such a prior art spring structure 52 suffers from the disadvantages hereinabove described.

In a preferred embodiment (and in the diskette 10) portions of housing half 18 which are adjacent the crest regions 42 and 43 are provided with a plurality of upstanding second ribs 48 and which ribs are in generally radially spaced parallel relationship to one another. The second ribs 48 extend preferably transversely relative to the crest regions 42 and 43.

The first ribs 47 and the second ribs 48 function to augment the biasing action of spring structure 29 and the wiping action achieved between pad member 27 and plate-like portion 12.

Particularly in combination with the ribs 47 and 48, the rounded outer surface portions of the crest regions 42 and 43 serve to avoid spring failure and to give a spring structure 29 and extended duty life.

In a preferred embodiment of the present invention (and as shown in the drawings; see FIG. 3 for example), a diskette 10 is provided upon interior surface portions of housing half 17 with an upstanding third rib 49. The third rib 49 is located so as to be adjacent the one region 37 and to be supportive of a portion of the wave 39 which is adjacent the one region 37. Such a partial support for the rib 39 appears to be desirable in strengthening the spring biasing action achievable with a spring structure 29.

Preferably a diskette 10 (as shown) is provided with a shutter 51 for covering the slotted aperture 24 in each housing half 17 and 18 when the diskette 10 is not in use. The shutter 51 is here comprised of a piece of folded metal (stainless steel or the like) which is positioned over the side edge portions of the assembled housing halves 17 and 18 which are adjacent the slotted aperture 24 with the size of the shutter leaf overlying exterior surface portions of each housing half 17 and 18 being such as to cover the slotted apertures 24. Tabs formed in the shutter 51 are provided to ride grooves formed in the housing halves 17 and 18. The shutter 51 thus is slidably moved from its open configuration shown toward the left in FIG. 1 to a closed configuration (where the slotted apertures 24 are covered by the shutter 51).

As those skilled in the art will appreciate, it may sometimes be desirable to incorporate into a diskette a second spring structure 29 in order to similarly yieldingly bias the pad member 28 against areas of the plate-like portion 12. Conveniently, such a second spring structure (not shown) is mounted to the housing half 18 in a manner similar to that in which the spring structure 29 is mounted to housing half 17 as described above. In the two spring structure configuration, the respective springs can be oriented in a diskette in an opposed relationship to one another.

Another embodiment of a spring structure of this invention is shown in FIG. 8 and is designated in its entirety by the numeral 58. Spring structure 58 has a first region 59 and a second region 61. First region 59 is structured similarly to one region 37 of spring structure 29. Second region 61 has a single wave 62 formed therein which upstands relative to first region 59 and the crest region 63 of wave 62 has a uniform height relative to first region 59. Between the fron end 64 of elongated piece 65 of the plastic sheeting used in spring structure 58 and the forward end 67 of wave 62 an elongated trough region 69 is provided which is generally coplanar with the first region 59. An adhesive layer 68 is provided on the lower face of first region 59. The elongated trough region 69 provides a stabilized spring base, as desired.

The spring structure of this invention can be made by any convenient procedure. For example, a sheet of polyethylene terephthalate formed of the material available commercially under the trade designation "PETG" such as is available commercially from such manufacturers as the duPont Company, ICI Company, and American Hoechst Company, is chosen, such sheet having a thickness of about 2–3 mils and dimensioned to have a width equal to the length of a particular chosen spring structure, such as that of spring structure 58 or the like, and to have a length equal to some approximate multiple of the width of such spring structure. This sheet is preheated to a temperature believed to be in the range from about 160° to 220° F. and then is immediately fed through a set of unheated contoured male/female forming rollers after which the resulting formed sheet is rapidly cooled. The adhesive layer is applied, and the product sheet is transversely cut to provide the desired multiple of individual spring structures.

Although the teachings of this invention have herein been discussed with reference to specific embodiments, it is to be understood that these are by way of illustration only and that others may wish to utilize the invention in different designs or applications.

We claim:
1. A spring structure for a micro floppy diskette or the like comprising:
   (A) an elongated piece of plastic sheeting having opposed, parallel faces and a front end and an opposite back end,

(B) said plastic sheeting being comprised of a resilient, flexible, relatively rigid, preformed, temperature stable, uniform organic polymeric material, (C) said piece including two regions, (D) one said region being generally flat and located adjacent said back end, (E) the other said region having at least one generally transversely extending wave formed therein, said wave being upstanding relative to said one region and having a generally uniform crest region with a trough region being defined on each side of each such wave, each trough region being generally coplanar with said one region, and said front end being generally coplanar with said one region, and (F) at least a portion of one said face in said one region bearing a layer of an adhesive, said one face being opposed to the other said face wherein the outer surface of each crest regions is defined.

2. The spring structure of claim 1 wherein said polymeric material comprises a polyester.

3. The spring structure of claim 2 wherein said polyester comprises polyethylne terephthelate.

4. The spring structure of claim 2 wherein said sheeting ranges from about 2 to 5 mils in thickness.

5. The spring structure of claim 1 wherein said upper surface of each of said crest regions is rounded.

6. The spring structure of claim 5 wherein said outer surface of each of said crest regions has a radius of curvature in the range from about 3/64 to 7/64 inches.

7. The spring structure of claim 6 wherein said crest region radius of curvature is about 3/32 inch.

8. The spring structure of claim 5 wherein the outer surface of each of said trough regions is rounded.

9. The spring structure of claim 8 wherein said outer surface of each of said trough regions has a radius of curvature in the range from about 3/64 to 7/64 inches.

10. The spring structure of claim 9 wherein said trough region radius of curvature is about 3/32 inch.

11. The spring structure of claim 1 wherein two said waves are defined therein and one said trough region exists therebetween.

12. The spring structure of claim 1 wherein from and including three through eight waves are defined therein and, correspondingly, the number of said troughs ranges from two through seven, respectively.

13. The spring structure of claim 1 wherein said adhesive is pressure sensitive and initially tacky.

14. A micro floppy diskette comprising in combination:

(A) a generally flexible disk member including a peripheral portion comprised of a magnetizable composition and an associated hub portion having an axial aperture defined therein and (B) a jacket assembly generally positioned about said flexible disk member, said jacket assembly including (1) a peripherally abutting pair of housing halves comprised of preformed rigid plastic material, (2) a pair of pad members, each one disposed on a different peripheral side of said flexible disk member, said pad members being comprised of thin, soft, flattened, resilient, flexible, uniform porous organic polymeric material, (3) a spring structure, and (4) fastening means for securing said housing halves together, (C) said housing halves together defining a central aperture for shaft insertion into said hub portion, and including in at least one of said halves a slotted aperture which overlies portions of said disk peripheral portion for magnetic head access thereto, (D) said spring structure comprising:

(1) an elongated piece of plastic sheeting having opposed, parallel faces and a front end and an opposite back end, (2) said plastic sheeting being comprised of a resilient, flexible, relatively rigid, preformed, ambient temperature stable, uniform organic polymeric material, (3) said piece including two regions, (4) one said region being generally flat and located adjacent said back end, (5) the other side region having at least two generally transversely extending, longitudinally spaced, but generally parallel relative to one another, waves formed therein, said waves all being upstanding relative to said one region and having generally uniform crest regions which are of generally equal height relative to one another with the trough region between each adjacent pair of said waves being generally coplanar with said one region, and with said front end being generally coplanar with said one region, and (6) at least a portion of one said face in said one region bearing a layer of an adhesive, said one face being opposed to the other said face wherein the outer surface of each crest regions is defined, (E) said adhesive layer being applied to one of said housing halves with said other region being oriented to cause said crest regions to apply yielding bias against a predetermined portion of an adjacent one of said pad members whereby said predetermined portion brushes selected areas of said peripheral portion during rotation of said flexible disk.

15. The micro floppy diskette of claim 14 wherein said spring structure is positioned within about 120° of said slotted aperture relative to the anticipated direction of rotation of said flexible disk.

16. The micro floppy diskette of claim 14 wherein said trough regions and said front end rest upon upstanding first ribs defined in adjacent portions of said one housing half which first ribs extend transversely relative to said trough regions.

17. The micro floppy diskette of claim 14 wherein portions of said other housing half adjacent said crest regions are provided with a plurality of upstanding second ribs which are in generally spaced, parallel relationship to one another and which extend transversely relative to said crest regions.

18. The micro floppy diskette of claim 14 wherein a portion of that wave which is adjacent said one region is partially supported by an upstanding third rib defined in an adjacent portion of said one housing half, said third rib extending generally parallel to said crest region of such wave.

19. The micro floppy diskette of claim 14 wherein said fastening means comprises sonic weldments.

20. The micro floppy diskette of claim 14 wherein said polymeric material of said spring structure comprises a polyester.

21. The spring structure of claim 1 wherein said other side region has at least two such waves are so formed therein each wave being longitudinally spaced but generally parallel to the others thereof and with all crests being of generally equal height relative to one another.

22. The spring structure of claim 1 wherein an elongated trough region is provided between the forward side of such wave and said front end, said elongated trough region being generally coplanar with said one region.

* * * * *